United States Patent [19]

Landon et al.

[11] Patent Number: 4,950,628

[45] Date of Patent: Aug. 21, 1990

[54] MATERIAL AND PROCESS TO PRODUCE LOW THERMAL EXPANSION CORDIERITE STRUCTURES

[75] Inventors: Thomas E. Landon, Painted Post; Martin J. Murtagh, Trumansburg; Mark A. Spetseris, Southport, all of N.Y.

[73] Assignee: Corning Incorporated, Corning, N.Y.

[21] Appl. No.: 340,434

[22] Filed: Apr. 19, 1989

[51] Int. Cl.$^5$ ............................................. C04B 35/18
[52] U.S. Cl. ................................... 501/119; 501/144; 501/118; 501/127
[58] Field of Search ............... 501/118, 119, 127, 150, 501/144

[56] References Cited

U.S. PATENT DOCUMENTS

| | | | |
|---|---|---|---|
| 4,280,845 | 7/1981 | Matsuhisa et al. | 501/43 |
| 4,528,275 | 7/1985 | Hodge | 501/119 |

*Primary Examiner*—William R. Dixon, Jr.
*Attorney, Agent, or Firm*—Richard N. Wardell

[57] ABSTRACT

The present invention is directed toward the improvement of the properties of cordierite sintered structures. The improvement consists essentially of heat treating the calcined kaolin component which when added to the batch of ray materials increases the thermal shock resistance and decreases the coefficient of thermal expansion.

12 Claims, No Drawings

MATERIAL AND PROCESS TO PRODUCE LOW THERMAL EXPANSION CORDIERITE STRUCTURES

BACKGROUND OF THE INVENTION

The present invention is directed toward improved thermal expansion and thermal shock resistance of cordierite structures. It has been found that by lengthening the time of and/or increasing the temperature of the heat treatment of the calcined kaolin prior to mixing this component as part of the cordierite batch, provides a combination of properties to the final fired structure heretofore unobserved. These improvements are manifested in the cordierite sintered structure by a combination of factors, such as lower thermal expansion coefficient, higher thermal shock resistance, and greater cordierite alignment as evidenced by the I ratio.

Structures, commonly shaped as a honeycomb, made from cordierite are used as substrates which are subsequently coated with a high surface area washcoat, such as alumina, catalyzed and subsequently placed in the path of the exhaust effluent of internal combustion engines. Other useful products made from such material can be gainfully employed as filters for fluids such as diesel particulate filters and ultrafiltration devices, or as substrates for woodstove combustors or DeNOx catalytic converters for power plants.

Those skilled in this art know that typically raw materials such as talc, kaolin clay, alumina, silica, aluminum hydroxide, various inorganic and organic binders, and water can be advantageously mixed to form a batch. The batch is plasticized and subsequently extruded to form greenware. The greenware is then fired to form a cordierite sintered structure.

It is known by those in this art that mullite may be formed during sintering and that if mullite is preferentially oriented within a certain plane of the structure during sintering, that the cordierite in the structure may be preferentially oriented, resulting in a lower thermal expansion in the resultant structure. The orientation is often discussed in terms of I ratio. The I ratio is defined as the preferred orientation axis divided by the other two axes in the three dimensional planes of the crystalline structure. In the case of cordierite, the preferred I ratio axis is the c-axis. Further discussion of the attributes of orientation may be found in "Thermal Expansion of Extruded Cordierite Ceramics" by Irwin M. Lachman, Rodney D. Bagley, and Ronald M. Lewis, American Ceramic Society Bulletin, Vol. 60, No. 2, February 1981, the disclosure of which is herein incorporated by reference.

U.S. Pat. No. 4,280,845 discloses the effects of orientation and firing schedules on the resultant durability of the cordierite structure. There, a full discussion flushes out the various advantages that accrue due to orientation, particle size, thermal expansion, and the effect of various phases found in the fired cordierite. Reference is made to a calcined kaolin component to the batch, however, no reference is made therein to processing the kaolin in a manner to produce a certain percentage of mullite prior to the firing of the cordierite body.

A continual problem in this art is the variation of batch parameters to enable the production of consistent structural properties when the ceramic process is put into manufacturing production scale-up. Prior to the present inventive insights, the calcined kaolin in this batch has been routinely added without notice of the variations that may be produced by its inclusion. The present invention, however, carefully considers this component and nails down the sensitivity of the final sintered product to the treatment of the calcined kaolin prior to mixing this component into the batch. Essentially, the modifications made thereto introduce to the batch a calcined kaolin of a different nature, the properties of which manifest themselves in the final fired structure.

SUMMARY OF THE INVENTION

A cordierite sintered structure consisting essentially of about 29 to 52 weight percent $SiO_2$, about 20 to 48 weight percent $Al_2O_3$, about 11 to 16 weight percent MgO, is formed of a cordierite-forming batch containing about 1 to 40 weight percent of heat treated calcined mullite forming clay, such as kaokin, halloysite, bentonite and ball clay, wherein the calcined mullite forming clay is heat treated for at least 1 hour at higher temperatures and for longer periods at lower temperatures in the calcination temperature range of 950° C. to 1150° C. to provide a novel calcined mullite forming clay to the overall batch which provides the final fired structure with a coefficient of thermal expansion under $7.0 \times 10^{-7}/°$ C. in the range of 25° to 800° C., a thermal shock resistance of greater than 800° C., and an I ratio greater than 0.750. The novel calcined mullite forming clay in the present invention, preferably a kaolin clay with, containing from 4 to 65 weight percent mullite, preferably 6 to 30 weight percent mullite, a preferable true density range with values from 2.75 to 2.90 grams per cubic centimeter, and a surface area less than about 9.5 $m^2$ per gram.

Prior to the present invention the calcined kaolin component was heat treated to attain its calcined state at temperature from about 900° up to 1050° C. Those skilled in this art know that the reflectivity of the calcined kaolin increases with increasing calcined temperature in the range of 600° to 1150° C. However, above about 1000° C. formation of mullite may cause an undesirable increase in abrasion for coating applications. The properties of brightness and low abrasion are optimized in the temperatue range of about 900° to 1000° C.

The reflectivity test is used as a quality control measure, whereby the temperature or feed rate of the kaolin is varied as a function of the reflectivity maximum and abrasion minimum. The in-process and resultant calcined kaolin, which are subjected to the reflectivity test, typically have a high surface area and are comprised essentially of meta-kaolin and a small percent of mullite. The desired result of these prior efforts was to maximize the meta-kaolin in the calcined kaolin and to minimize the amount of mullite.

The present invention seeks a result pursuing an opposite direction to the criteria of the reflectivity and abrasion test. Rather than strive for maximum surface area, the approach taken here is to either continue the length of the heat treatment so that more mullite is formed in the calcined kaolin or to increase the calcining temperature so that more mullite is formed. As a consequence, this specially heat treated calcined kaolin has less surface area than before obtained. However, for a given particle size, the loss of surface area for this component has a minimal negative effect on the overall performance of the cordierite sintered structure. The benefits that accrue from enhancing the heat treatment of the calcined kaolin include decreases in the coefficient of thermal expansion and increases in the thermal shock resistance as revealed in the final sintered product. Mullite forming clays other than kaolinite, halloysite, bentonite, and ball clay in the aforementioned calcined state, exhibit a similar orientation as that of the calcined kaolin with a similar effect on the resultant sintered structure. The cordierite structure is fired between about 1150° to 1450° C.

Therefore, for the purposes of the present invention, the reflectivity test would lead to a different result than desired by this invention. As those skilled in this art can appreciate in the calcined mulite forming clay for this invention, the particle size distribution may be altered, there is a higher percentage of mullite present, and the true density is increased from 2.6 up to from 2.75 to 2.9 grams per cubic centimeter. It is speculated that the surface charge of the specially heat treated calcined kaolin may be altered thus providing additional benefits when this inventive calcined kaolin is mixed with the other batch components.

The specially heat treated calcined kaolin of the present invention has a cumulative particle size ranging from about 25 to 40 percent of less than 1 micron in diameter, in combination with particle sizes of no more than 45 percent less than 2 microns in diameter but greater than or equal to 1 micron.

DETAILED DESCRIPTION OF THE PREFERRED EMBODIMENTS

In the practice of this invention the following procedure was followed in batching, forming, and firing the compositions of the present invention. Those skilled in this art can appreciate that certain modifications of this procedure may be effected to obtain similar results. Generally, the compositions of interest of the sintered structures are about 29 to 52 weight percent silica, preferably 48.2 to 51.2 percent, about 20 to 48 weight percent alumina, preferably 33.9 to 36.9 weight percent, and about 11–16 weight percent magnesia, preferably 12.5 to 14.5.

Talc, kaolin, aluminum oxide, and amorphous silica, were mixed in proportions as shown in the bottom part of Table 1 as the initial batch. In Examples 2, 4, and 6, 25.4 weight percent commercially available calcined kaolin was mixed with initial batch in the proportions shown as representative of the prior art. In Examples 1, 3, 5, and 7, 25.4 weight percent specially heat treated calcined kaolin of the present invention was mixed with the initial batch in the proportions shown. To these mixtures was added 30.5 parts by weight water based on 100 parts by weight mixture. 2.7 parts by weight methyl cellulose and 0.6 parts by weight sodium stearate was added to the mixture. The mixture was mixed in a rotary mixer, kneaded and extruded into a honeycomb shape by a vacuum extruder. The formed structures were dried and then fired to obtain cordierite honeycombs. The top part of Table 1 shows the final fired compositions of the cordierite Examples. The Examples were sintered at about 1400° C.

Table 2 shows the different properties of the commercially available calcined kaolin and the additionally heat treated calcined kaolin. Consistent with Table 1, Examples 2, 4, and 6 are the commercially available calcined kaolin and Examples 1, 3, 5, and 7 contain the specially heat treated calcined kaolin of the present invention. All the values of Examples 1, 3, 5, and 7 for true density or specific gravity are greater than for Examples 2, 4, and 6. The weight percent of mullite in Examples 1, 3, 5, and 7 are significantly greater than those of Examples 2, 4, and 6. And the values of the surface area of Examples 1, 3, 5, and 7 are less than those of Examples 2, 4, and 6. The specially heat treated calcined kaolin was heated up to between 950° to 1150° C. At the lower end of this calcining temperature range for the specially heat treated calcined kaolin, longer times are needed to effect the result of the higher temperature, shorter time period.

TABLE 1

| Chemical Composition | 1 | 2 | 3 | 4 | 5 | 6 | 7 |
|---|---|---|---|---|---|---|---|
| $SiO_2$ | 50.3 | 50.3 | 50.3 | 50.3 | 50.3 | 50.3 | 50.3 |
| $Al_2O_3$ | 36.0 | 36.0 | 36.0 | 36.0 | 36.0 | 36.0 | 36.0 |
| MgO | 13.7 | 13.7 | 13.7 | 13.7 | 13.7 | 13.7 | 13.7 |
| Talc | 40.8 | 40.8 | 40.8 | 40.8 | 40.8 | 40.8 | 40.8 |
| Kaolin | 15.4 | 15.4 | 15.4 | 15.4 | 15.4 | 15.4 | 15.4 |
| Alum. Oxide | 14.9 | 14.9 | 14.9 | 14.9 | 14.9 | 14.9 | 14.9 |
| Amorph. $SiO_2$ | 1.5 | 1.5 | 1.5 | 1.5 | 1.5 | 1.5 | 1.5 |

TABLE 2

| Calcined Clay Properties | 1 | 2 | 3 | 4 | 5 | 6 | 7 |
|---|---|---|---|---|---|---|---|
| % <1μ | 32 | 33 | 33 | 34 | 25 | 32 | 33 |
| % <2μ | 58 | 59 | 63 | 60 | 57 | 59 | 64 |
| S. Area $m^2/g$ | 8.6 | 9.8 | 8.5 | 9.7 | 6.3 | 9.7 | 8.5 |
| % Mullite | 7.4 | 3.3 | 9.4 | 4.1 | 48 | 3.3 | 9.8 |
| True Density gm/cc | 2.79 | 2.7 | 2.77 | 2.76 | 2.8 | — | — |

TABLE 3

| Measured Properties | 1 | 2 | 3 | 4 | 5 | 6 | 7 |
|---|---|---|---|---|---|---|---|
| Thermal Exp. | 4.98 | 6.37 | 6.18 | 7.3 | 5.68 | 6.67 | 6.19 |
| Thermal Shock Resistance | 895 | 800 | 836 | 778 | 913 | 806 | — |
| I ratio | 0.803 | 0.747 | 0.803 | 0.757 | 0.791 | 0.787 | 0.787 |

Table 3 shows the properties of both the prior art cordierite sintered structures and the properties of the structures of the present invention. The Example numbers of Table 3 are consistent with those of Tables 1 and 2. The coefficient of thermal expansion, in units of $10^{-7}$ inches per inch per degree C within the range of 25° to 800° C. of Examples 1, 3, 5, and 7 are all significantly lower than those of Examples 2, 4, and 6. The measured thermal shock resistance of the inventive structures are all higher than those of the prior art. The I ratio is consistently equal to or greater than that of the prior art.

To test the thermal shock property, a piece of the sintered structure was placed in a canister and subjected to cycles of heated air and room temperature air. After 20 cycles, the piece was removed, checked visually for cracks and tapped to determine clarity of the "ring". If a piece passed this test it was returned to the canister and the temperature increased by 25° C. This procedure was repeated until a crack was detected visually or by a decreased clarity of the "ring". The temperature of the test that produced the failure is recorded as the failure temperature. The temperature range of the test was 650° to 975° C.

The Examples of Table 1, Table 2, and Table 3 were grouped in three different experiments. Examples 1 and 2 were experiment 1, Examples 3 and 4 were experiment 2, and Examples 5, 6, and 7 were experiment 3. These experimental observations should be compared within each experiment to find substantially significant differences between the prior art and the present invention.

We claim:

1. A cordierite sintered structure consisting essentially of about 29 to 52 weight percent $SiO_2$, 20 to 48 weight percent $Al_2O_3$, 11 to 16 weight percent MgO, characterized by the improvement of being formed of a cordierite-forming batch containing about 1 to 40 weight percent of calcined mullite forming clay containing about 4 to 65 percent by weight mullite, having a true density ranging from 2.75 to 2.9 grams per cubic centimeter, the rest of the batch comprising conventional cordierite-forming materials and the structure has a coefficient of thermal expansion less than $7.0 \times 10^{-7}/°$C. within the range of 25° to 800° C., has a thermal shock resistance failure temperature of greater than 800° C., and an I ratio greater than 0.750.

2. The structure of claim 1 wherein said calcined mullite forming clay has a surface area of less than about 9.4 m² per gram.

3. The structure of claim 1 wherein said calcined mullite forming clay consists essentially of particles having a particle sizes of about 25 to 40 percent less than 1 micron and no more than 45 percent less than 2 microns but greater than or equal to 1 micron.

4. The structure of claim 1 wherein said calcined mullite forming clay contains 6 to 30 percent by weight mullite.

5. A method of making cordierite sintered structure comprising the steps of making a formable cordierite-forming batch mixture containing about 1 to 40 weight percent calcined mullite forming clay, which clay contains about 4 to 65 weight percent mullite, the rest of the batch comprises conventional cordierite-forming materials, and yielding a composition consisting assentially of about 29 to 52 weight percent $SiO_2$, 20 to 48 weight percent $Al_2O_3$, and 11 to 16 weight percent MgO, forming said batch mixture into a structure, and firing said structure between about 1150° and 1450° C. to form a sintered cordierite structure having a coefficient of thermal expansion under $7.0 \times 10^{-7}/°$C. within the range of 25° to 800° C., a thermal shock resistance failure temperature of greater than 800° C., and an I ratio greater than 0.750.

6. The method of claim 5 wherein said calcined mullite forming clay contains 6 to 30 weight percent mullite.

7. The method of claim 5 wherein said calcined mullite forming clay has a true density of 2.75 to 2.9 grams per cubic centimeter.

8. The method of claim 5 wherein said calcined mullite forming clay has a surface area less than about 9.5 m² per gram.

9. The structure of claim 1 wherein the mullite forming clay is selected from kaolin, halloysite, bentonite, and ball clay.

10. The structure of claim 9 wherein the mullite forming clay is kaolin.

11. The method of claim 5 wherein the mullite forming clay is selected from kaolin, halloysite, bentonite, and ball clay.

12. The method of claim 11 wherein the mullite forming clay is kaolin.

* * * * *

UNITED STATES PATENT AND TRADEMARK OFFICE
CERTIFICATE OF CORRECTION

Page 1 of 2

PATENT NO. : 4,950,628
DATED : August 21, 1990
INVENTOR(S) : Thomas E. Landon, Martin J. Murtagh, Mark A. Spetseris It is certified that error appears in the above-identified patent and that said Letters Patent is hereby corrected as shown below:

In Abstract, -- ray -- should read -- raw --.

Column 2, line 17, -- kaokin -- should read -- kaolin --.

Column 2, line 29, -- with, -- should be omitted.

Column 3, line 3, after "kaolinite," should read -- such as --.

Column 3, line 12, after "appreciate" should be -- , --.

Column 3, line 12, -- mulite -- should read -- mullite --.

Column 3, line 61, -- additionally -- should read -- specially --.

Column 3, line 63, -- are -- should read -- contain --.

Column 5, Claim 2, line 20, -- $9.4m^2$ -- should read -- $9.5m^2$ --.

UNITED STATES PATENT AND TRADEMARK OFFICE
CERTIFICATE OF CORRECTION

Page 2 of 2

PATENT NO.   : 4,950,628
DATED        : August 21, 1990
INVENTOR(S)  : Thomas E. Landon, Martin J. Murtagh, Mark A. Spetseris It is certified that error appears in the above-identified patent and that said Letters Patent is hereby corrected as shown below:

Column 6, Claim 5, line 2, -- comprises -- should read -- comprising --.

Column 6, Claim 5, line 3, -- assen- -- should read -- essen- --.

Signed and Sealed this

Third Day of November, 1992

Attest:

DOUGLAS B. COMER

Attesting Officer

Acting Commissioner of Patents and Trademarks